(12) United States Patent
Naruoka et al.

(10) Patent No.: US 12,651,682 B2
(45) Date of Patent: Jun. 9, 2026

(54) PRODUCTION METHOD OF A CONDUCTIVE MEMBER

(71) Applicant: NAGASE & CO., LTD., Osaka (JP)

(72) Inventors: Tamanobu Naruoka, Kyoto (JP); Noriaki Shibata, Aichi (JP)

(73) Assignee: NAGASE & CO., LTD., Osaka (JP)

( * ) Notice: Subject to any disclaimer, the term of this patent is extended or adjusted under 35 U.S.C. 154(b) by 78 days.

(21) Appl. No.: 18/562,503

(22) PCT Filed: Mar. 4, 2022

(86) PCT No.: PCT/JP2022/009466
§ 371 (c)(1),
(2) Date: Nov. 20, 2023

(87) PCT Pub. No.: WO2022/254849
PCT Pub. Date: Dec. 8, 2022

(65) Prior Publication Data
US 2024/0242859 A1 Jul. 18, 2024

(30) Foreign Application Priority Data

May 31, 2021 (JP) ................................. 2021-091811

(51) Int. Cl.
*B29C 45/14* (2006.01)
*B29C 45/16* (2006.01)
(Continued)

(52) U.S. Cl.
CPC ....... *H01B 19/00* (2013.01); *B29C 45/14336* (2013.01); *B29C 45/14639* (2013.01);
(Continued)

(58) Field of Classification Search
CPC ........ B29C 45/14336; B29C 45/14639; B29C 45/1642
See application file for complete search history.

(56) References Cited

U.S. PATENT DOCUMENTS 4,133,101 A * 1/1979 Glover ................... H02G 5/005
264/156
4,517,406 A * 5/1985 Erdle ..................... H02G 5/005
174/72 B
(Continued)

FOREIGN PATENT DOCUMENTS

CN 203739136 * 7/2014
JP 2002-008601 A 1/2002
(Continued)

OTHER PUBLICATIONS

International Search Report in International Patent Application No. PCT/JP2022/009466, dated Apr. 26, 2022, along with an English translation thereof.
(Continued)

*Primary Examiner* — Edmund H Lee
(74) *Attorney, Agent, or Firm* — Greenblum & Bernstein, P.L.C.

(57) ABSTRACT

A method for producing a conductive member in which an insulating film is interposed between two metal plates includes: a first molding step for forming an intermediate product in which a solidified, insulating first resin covers the insulating film, such that the insulating film is at least partially exposed; and a second molding step for covering sandwiching parts of the two metal plates with an insulating second resin in a state where at least a portion of the exposed part of the insulating film of the intermediate product is sandwiched between the two metal plates.

6 Claims, 11 Drawing Sheets

(51) Int. Cl.
| | |
|---|---|
| *H01B 7/02* | (2006.01) |
| *H01B 19/00* | (2006.01) |
| *B29K 705/00* | (2006.01) |
| *B29L 31/34* | (2006.01) |

(52) U.S. Cl.
CPC ........... *B29C 45/1642* (2013.01); *H01B 7/02* (2013.01); *B29K 2705/00* (2013.01); *B29K 2995/0007* (2013.01); *B29L 2031/34* (2013.01)

(56) References Cited

U.S. PATENT DOCUMENTS

| | | | | |
|---|---|---|---|---|
| 7,560,153 | B2 * | 7/2009 | Takanashi | B29C 45/14639 428/68 |
| 7,958,630 | B2 * | 6/2011 | Matsuoka | H01R 43/24 29/426.6 |
| 8,568,547 | B2 * | 10/2013 | Yamazaki | B29C 45/14221 156/221 |
| 10,907,268 | B2 * | 2/2021 | Nakagawa | B32B 27/34 |
| 2011/0091792 | A1 | 4/2011 | Sugimoto et al. | |
| 2013/0059227 | A1 | 3/2013 | Suh et al. | |

FOREIGN PATENT DOCUMENTS

| | | | | |
|---|---|---|---|---|
| JP | 2007-038490 | A | | 2/2007 |
| JP | 2009-283412 | A | | 12/2009 |
| JP | 2010-192432 | A | | 9/2010 |
| JP | 2011046196 | A | | 3/2011 |
| JP | 2012-235625 | A | | 11/2012 |
| JP | 2013-058465 | A | | 3/2013 |
| JP | 2014-034178 | A | | 2/2014 |
| JP | 2021123104 | | * | 8/2021 |
| WO | WO2016185706 | | * | 11/2016 |

OTHER PUBLICATIONS

International Preliminary Report on Patentability in International Patent Application No. PCT/JP2022/009466, dated Nov. 21, 2023 (English translation).
Extended European Search Report in related European Application No. 22815606.3, dated Mar. 25, 2025.

* cited by examiner (a)

(b)

(c)

(d)

(a)

(b)

(c)

(d)

(a)

(b)

(c)

(d)

(e)

(f)

(a)

(b)

(c)

(a)

(b)

PRODUCTION METHOD OF A CONDUCTIVE MEMBER

TECHNICAL FIELD

The present invention relates to a conductive member such as a busbar having an insulating film interposed between two conductive metal plates, and a production method thereof.

BACKGROUND ART

Conventionally, in power converting devices such as inverters and converters mounted in electric vehicles, for example, a conductive member called a busbar is used for wiring of a path through which a large current flows. A busbar is a rigid wiring member formed by forming a conductive metal plate such as copper, aluminum, or other alloy into a desired shape. A busbar has a relatively large cross-sectional area, and thus has low electric resistance, and the fact that busbars may be brought into surface contact with each other, which has advantages of reducing current loss.

In addition, a conductive member laminated with an insulating layer interposed between two busbars is also known. In other words, in general, when a current is generated in a busbar, a magnetic field is generated around the busbar: however, when a large current flows such as in the busbar of an electric vehicle, for example, the current loss due to the magnetic field cannot be ignored, and there is a problem in that a power consumption rate (electricity cost) deteriorates and a continuous cruising distance becomes short. As a result, it becomes necessary to increase the size of a storage battery in order to increase the continuous cruising distance of the electric vehicle. As a measure for suppressing such current loss due to a magnetic field, as described above, a laminated structure in which two busbars are laminated with an insulating layer interposed therebetween has been proposed. In this way, the magnetic field can be canceled by generating currents in opposite directions in the two laminated busbars. When doing this, by minimizing a gap between the two busbars, that is, the thickness of the insulating layer, the inductance can be minimized and the current loss can be suppressed.

Regarding such a laminated structure of busbars, Patent Literature 1, for example, discloses a busbar module in which two busbars are used as inserts and an insulating resin is molded between the busbars, and discloses a method of producing the same. In addition, Patent Literature 2 discloses a molded body in which an insulating film (spacer polymer part) is interposed between two busbars.

CITATION LIST

Patent Literature

Patent Literature 1: JP 2012-235625 A
Patent Literature 2: JP 2007-038490 A

SUMMARY OF INVENTION

Technical Problem

Incidentally, in a case where insulating resin is molded between two busbars as in Patent Literature 1, when the gap between the busbars is narrow (for example, 0.5 mm or less), it becomes difficult for molten resin to be poured into the gap. Therefore, in the technique of Patent Literature 1, it is essential to ensure a large gap between the busbars to the extent that the molten resin can be reliably poured. In order to achieve an ultra-low-inductance busbar, it is required to narrow the gap between the busbars as much as possible: however, for the reasons described above, it is difficult to achieve this with the technique of molding an insulating resin as in Patent Literature 1.

On the other hand, in a case where an insulating film is sandwiched between two busbars as in Patent Literature 2, by making the thickness of the insulating film thin, the gap between the busbars can be narrowed compared with the case of molding insulating resin between the busbars as in Patent Document 1. However, when the two busbars are energized, electric leakage or the like will occur, which will directly lead to failure of the electronic parts or a fire. Therefore, in the technique disclosed in Patent Literature 2, it is required to ensure the insulation state of each busbar by arranging the insulating film so as to protrude from between the busbars and to form a surplus portion in the insulating film.

However, in a case of performing injection molding (insert molding) after inserting a very thin insulating film between the busbars, there is a problem in that the surplus portion of the insulating film (the portion protruding from the busbars) is swept away by the molten resin during the injection molding process and the behavior thereof becomes unstable, and as a result, variations occur in the final product quality. In addition, when the insulating film is very thin, it is difficult to maintain a state of tension in the insulating film between the busbars during injection molding. For example, in a case where the insulating film becomes wrinkled or twisted between the busbars, the gap between the busbars becomes uneven, which adversely affects the quality of the final product. Furthermore, there is also a problem that, when the insulating film is very thin, it is difficult to precisely arrange the two busbars on both sides of the film.

Accordingly, a main object of the present invention is to enable efficient production of a conductive member in which two busbars (metal plates) sandwiching an insulating film are coated with a resin. In addition, another object of the present invention is to achieve a conductive member with ultra-low inductance performance by establishing an efficient production method for a conductive member with an extremely thin insulating film interposed between two busbars.

Solution to Problem

The inventors of the present invention, as a result of intensive study on means for solving the above-mentioned problems of the prior art, obtained knowledge that by arranging busbars on both sides of an insulating film and covering the busbars with insulating resin after a part of the insulating film is reinforced with solidified insulating resin, it is possible to efficiently produce a conductive member even in a case where an extremely thin insulating film is used. Then, based on the above knowledge, the inventors of the present invention conceived an idea that the problems of the prior art could be solved, and completed the present invention. More specifically, the present invention has the following steps or configurations.

A first aspect of the present invention relates to a production method of a conductive member 100. The conductive member 100 has a structure in which an insulating film 10 is interposed between two metal plates 30, 40. The production method according to the present invention includes a primary molding step and a secondary molding step.

In the primary molding step, an intermediate product 60 is produced in which the insulating film 10 is covered with an insulating first resin 20 so that the insulating film 10 is at least partially exposed. More specifically, it is preferable to reinforce the insulating film 10 with the insulating first resin 20 that has been solidified so that it is possible to maintain a state of tension of the insulating film 10. Even more specifically, in the present invention, the metal plates 30, 40 are arranged on both sides of the insulating film 10, and thus the insulating film 10 is divided into planned arrangement sites where the metal plates 30, 40 are to be arranged and other surplus portion in a plan view: however, it is preferable to cover a large part of this surplus portion (90% or more) with the solidified first resin 20. The primary molding step may include coating a part of the insulating film 10 with the first resin 20 by an injection molding step, or may include covering a part of the insulating film 10 with the first resin 20 by attaching a pre-molded component made of the first resin 20 to the insulating film 10 (assembly step).

In the secondary molding step, in a state in which a part or all of the exposed portion of the insulating film 10 in the intermediate product 60 is sandwiched between the two metal plates 30, 40, the sandwiching parts 32, 42 of the two metal plates 30, 40 sandwiching the insulating film 10 are covered with an insulating second resin 50. When doing this, it is necessary that terminal portions 31, 41 of the metal plates 30, 40 be exposed without being covered with the second resin 50. In addition, the second resin 50 may be the same as the first resin 20 or may be different. For example, in a case of attaching the first resin 20 to the insulating film 10 by injection molding, the secondary molding step is performed after the first resin 20 is solidified. Therefore, even when the second resin 50 is the same as the first resin 20, an interface will exist between the second resin 50 and the first resin 20. In the secondary molding step, similarly to the primary molding step, the sandwiching parts 32, 42 of the metal plates 30, 40 sandwiching the insulating film 10 may be covered with the second resin 50 by an injection molding step, or the sandwiching parts 32, 42 of the metal plates 30, 40 sandwiching the insulating film 10 may be covered with the second resin 50 by attaching a part made of the second resin 50 molded in advance to the intermediate product 60 (assembly step).

As in the above-described step, in the present invention, the surplus portion of the insulating film 10 is covered (reinforced) with the first resin 20 in the primary molding step, and then the sandwiching parts 32, 42 of the two metal plates 30, 40 sandwiching the insulating film 10 are covered with the second resin 50 in the secondary molding step. As a result, even when the secondary molding step is an injection molding step, for example, the surplus portion of the insulating film 10 is reinforced with the first resin 20, and thus the behavior of the surplus portion of the insulating film 10 during injection molding can be controlled. In addition, during the secondary molding step (injection molding), it becomes easy to maintain a state of tension in the insulating film 10 between the metal plates 30, 40, and it is easy to make a gap between the two metal plates 30, 40 uniform. Furthermore, each of the metal plates 30, 40 can be aligned with the exposed portion of the insulating film 10 that is not covered with the first resin 20, and thus the two metal plates 30, 40 can be precisely arranged on both sides of the insulating film 10. Therefore, with the present invention, variations in quality of the finally obtained conductive member 100 can be suppressed, and production efficiency thereof can be increased. Moreover, with the present invention, even when the insulating film 10 is extremely thin, the insulating film 10 can be accurately placed between the metal plates 30, 40 while keeping the thickness thereof uniform. Therefore, with the present invention, the gap between the metal plates 30, 40 can be made as small as possible, and it is possible to achieve a conductive member 100 with ultra-low inductance performance. Note that the gap between each of the metal plates 30, 40 is preferably 0.5 mm or less, and more preferably 0.1 mm or less.

In the present invention, the primary molding step is preferably a step of covering all or part of the peripheral edge of the insulating film 10 with the first resin 20. In a case where the insulating film 10 is sandwiched between the two metal plates 30, 40, a surplus portion will be formed at the peripheral edge of the insulating film 10: however, by covering the peripheral edge with the first resin 20, the above-mentioned problems may be solved.

In the present invention, the primary molding step is preferably an injection molding step. More specifically, in the primary molding step, the insulating film 10 is arranged in a first mold 200 having a cavity corresponding to the portion to be covered with the first resin 10, and molten first resin 20 is injected into the cavity, after which the first resin 20 is solidified. As a result, the intermediate product 60 made of the insulating film 10 reinforced with the first resin 20 can be efficiently produced.

In the present invention, in a case where the primary molding step is an injection molding step, it is preferable to inject the molten first resin 20 into the cavity of the first mold 200 in a state in which a portion of the insulating film 10 inserted into the cavity is fixed by the first mold 200. For example, small holes 11 are formed in the peripheral edge of the insulating film 10, and pins 221 corresponding to the small holes 11 are provided in the cavity of the first mold 200. Then, when arranging the insulating film 10 in the first mold 200, by inserting the pins 221 of the first mold 200 into the small holes 11 of the insulating film 10, the peripheral edge portion of the insulating film 10 can be fixed to the first mold 200. Thus, the peripheral edge portion of the insulating film 10 may be more reliably covered with the first resin 20.

In the present invention, the primary molding step may be an assembly step. More specifically, the primary molding step may be a step of attaching a component made of the first resin that has been solidified to the insulating film 10. The assembly step is suitable in cases such as producing intermediate products 60 in small lots, for example.

In the present invention, the secondary molding step is preferably an injection molding step. More specifically, in the secondary molding step, the sandwiching parts 32, 42 of the two metal plates 30, 40 sandwiching the insulating film 10 are arranged in a second mold 300 having a cavity corresponding to a portion covered with the second resin 50, and molten second resin 50 is injected into the cavity, after which the second resin 50 is solidified. Generally, in the secondary molding step (injection molding), the surplus portion of the insulating film 10 that is not sandwiched between the two metal plates 30, 40 is washed away by the molten resin, so the behavior of the surplus portion may become unstable. On the other hand, in the present invention, as described above, the surplus portion of the insulating film 10 is reinforced by the first resin 20, and thus the behavior of the surplus portion can be stabilized.

In the present invention, in the secondary molding step (injection molding), it is preferable that the molten second resin 50 be injected into the cavity of the second mold 300 while the sandwiching parts 32, 42 of the two metal plates 30, 40 sandwiching the insulating film 10 are pressed from one side or both sides toward the insulating film 10 by the second mold 300. As a result, it becomes easier to maintain a uniform thickness of the insulating film 10 sandwiched between the two metal plates 30, 40 (that is, the gap between the metal plates 30, 40).

In the present invention, the secondary molding step may be an assembly step. More specifically, the secondary molding step is a step of attaching the solidified second resin 50 to the sandwiching parts 32, 42 of the two metal plates 30, 40 sandwiching the insulating film 10. Such an assembly step is suitable, for example, when the conductive member 100 is produced in small lots. Note that the following examples can be given as how to combine the methods of the primary molding step and the secondary molding step.

(1) Primary molding step: injection molding, Secondary molding step: injection molding (2) Primary molding step: injection molding, Secondary molding step: assembly (3) Primary molding step: assembly, Secondary molding step: injection molding (4) Primary molding step: assembly, Secondary molding step: assembly A second aspect of the present invention relates to a conductive member 100. More specifically, the conductive member 100 according to the second aspect of the present invention can be produced by the production method according to the first aspect described above or other methods. The conductive member 100 according to the present invention includes: an insulating film 10; a first resin layer 20 partially laminated on both sides or one side of the insulating film 10; two metal plates 30, 40 arranged so as to at least partially sandwich an exposed portion of the insulating film 10 on which the first resin layer 20 is not laminated after the first resin layer has been solidified: and a second resin layer 50 covering sandwiching parts 32. 42 of the two metal plates 30, 40 sandwiching the insulating film 10. Note that terminal portions 31, 41 of the metal plates 30, 40 are not covered with the second resin layer 50 and are exposed. In addition, the first resin layer 20 and the second resin layer 50 may be made of the same resin material or may be made of different resin materials. However, even in a case where the first resin layer 20 and the second resin layer 50 are made of the same resin material, an interface will exist between the two layers.

Effect of the Invention

With the present invention, production efficiency may be improved in producing a conductive member in which two busbars (metal plates) sandwiching an insulating film are coated with resin. In addition, with the present invention, it is possible to efficiently produce a conductive member with an extremely thin insulating film interposed between two busbars, and thus it is possible to achieve a conductive member having ultra-low inductance performance.

DESCRIPTION OF EMBODIMENTS

Hereinafter, embodiments for implementing the present invention will be described using the drawings. The present invention is not limited to the embodiments described below, and includes appropriate modifications within a scope obvious to a person skilled in the art based on the following embodiments.

Figure 1:
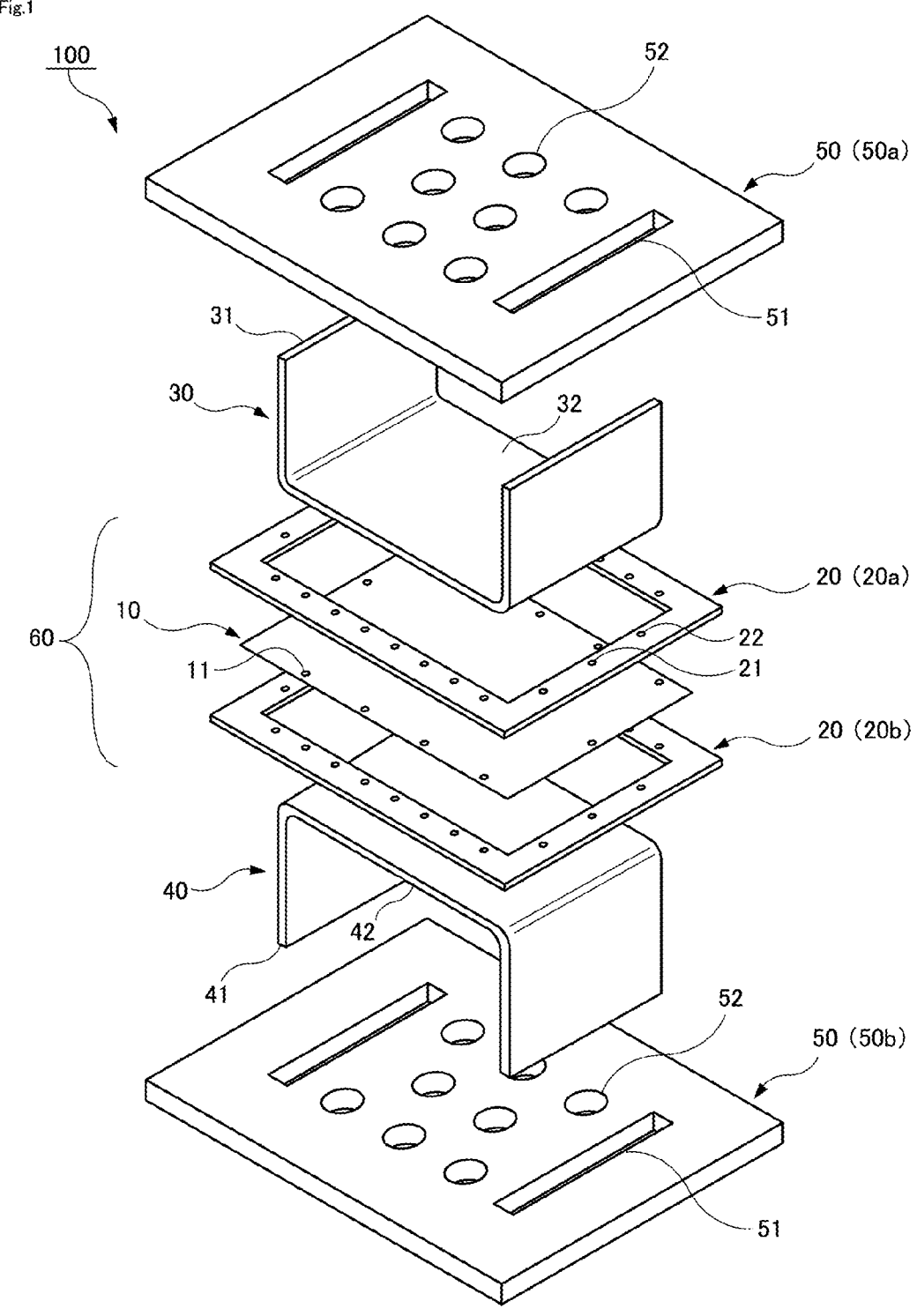
FIG. 1 is an exploded perspective view schematically illustrating components of a conductive member according to one embodiment of the present invention.
Figure 2:
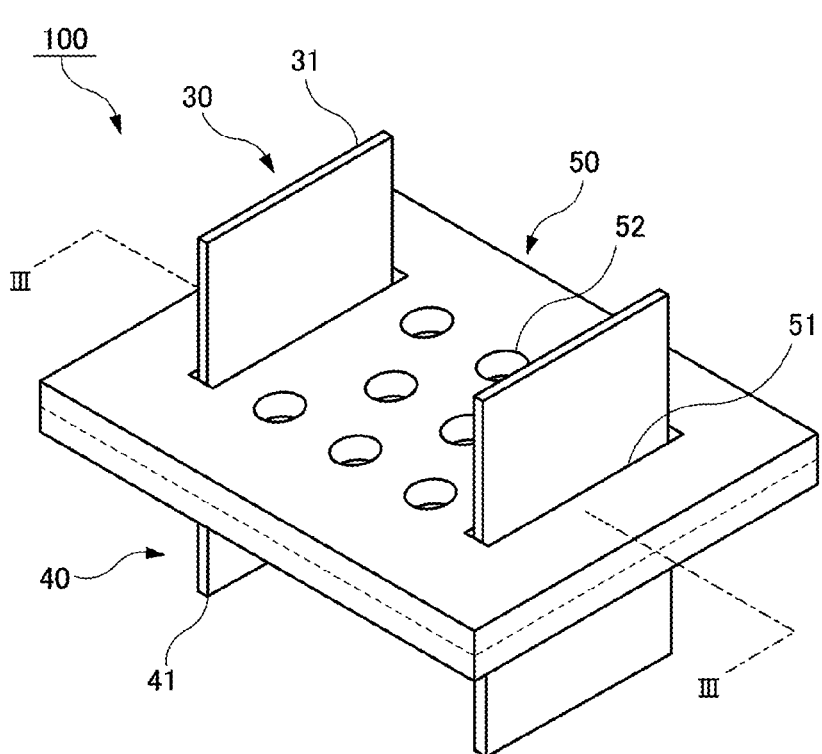
FIG. 2 is a perspective view of a conductive member in which the components illustrated in FIG. 1 are combined.
Figure 3:
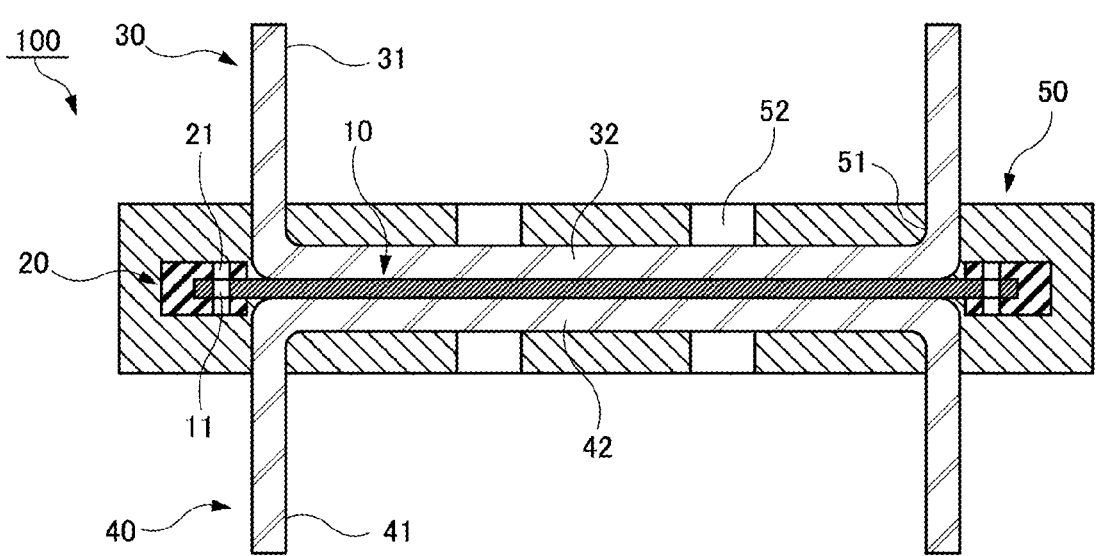
FIG. 3 is a cross-sectional view schematically illustrating a cross-sectional structure taken along line III-III in FIG. 2.

A conductive member 100 according to an embodiment of the present invention will be described with reference to FIGS. 1 to 3. FIG. 1 illustrates conceptually exploded components of the conductive member 100, and FIG. 2 illustrates a completed conductive member 100 in which the components illustrated in FIG. 1 are combined. In addition, FIG. 3 illustrates a cross-sectional view (FIG. 2 III-III) of the conductive member 100 as the completed product.

As illustrated in FIG. 1, the conductive member 100 basically includes a first metal plate 30, a second metal plate 40, and an insulating film 10 interposed between these metal plates 30, 40. Each of the metal plates 30, 40 may be used as a busbar that handles a large current, for example. The insulating film 10 is an element for keeping the metal plates 30, 40 in an insulated state. By insulating the metal plates 30, 40 with the insulating film 10, it is possible, for example, to pass currents through the two metal plates 30, 40 in opposite directions. As a result, magnetic fields in opposite directions are generated around the metal plates 30, 40, and thus it is possible to cancel out the magnetic fields. Thus, the loss of current flowing through each metal plate 30, 40 can be reduced. In particular, by making a thickness of the insulating film 10 extremely thin and narrowing a gap between the metal plates 30, 40, the conductive member 100 with ultra-low inductance can be achieved.

A general busbar may be used as each of the metal plates 30, 40. For example, the metal plates 30, 40 may be formed by appropriately cutting or bending a conductive plate-shaped metal such as copper, aluminum, or other alloys. Each of the metal plates 30, 40 has two terminal portions 31, and electricity input to one terminal portion 31 flows to the other terminal portion 31. In the embodiment illustrated in FIG. 1, each of the metal plates 30, 40 is formed in a U shape by bending a rectangular plate at two points. In the drawing, each of the metal plates 30, 40 has a flat surface portion extending in a horizontal direction and two side surface portions standing vertically at both ends of the flat surface portion. The horizontal portions of the metal plates 30, 40 are in direct contact with the insulating film 10 and serve as portions (sandwiching parts 32, 42) that sandwich the insulating film 10, and the two side surface portions function as terminal portions 31, 41.

A general film may be used as the insulating film 10. As the insulating film 10, for example, a plastic film may be used. Examples of plastic material include: polyethylene (PE), polypropylene (PP), polyethylene terephthalate (PET), polyethylene naphthalate (PEN), vinyl chloride resin (PVC), polystyrene (PS), acrylic (AC), polycarbonate (PC), polyphenylene sulfide (PPS), fluororesin (PTFE), polyetheretherketone (PEEK), polyethersulfone (PES), polyphenylene ether (PPE), polybutylene terephthalate (PBT), polyamide (PA), and liquid crystal polymer (LCP). With the present invention, very thin insulating films 10 may be handled. From an aspect of reducing inductance, the thickness of the insulating film 10 is preferably 0.5 mm or less, and more preferably 0.1 mm or less, and even more preferably 0.05 mm or less. Note that in the illustrated example, the insulating film 10 is formed in a rectangular shape: however, the shape of the insulating film 10 is not limited to this, and may be appropriately shaped according to the application of the conductive member 100.

As illustrated in FIG. 1 and FIG. 3, the conductive member 100 according to the present invention further includes a first resin layer 20 as an element for reinforcing the insulating film 10. Note that in the exploded view illustrated in FIG. 1, in order to show the arrangement of the first resin layer 20 in the present embodiment in an easy to understand manner, the first resin layer 20 is drawn as layers (20a, 20b) divided into the front side and the back side of the insulating film 10. However, in a case where the first resin layer 20 is formed by injection molding as described later, there is no substantial separation between the first resin layers 20 (20a, 20b) present on the front side and the back side of the insulating film 10, and both layers are integrally formed.

In the present embodiment, the first resin layer 20 is formed so as to cover the peripheral edge of the insulating film 10 from both the front side and the back side. Specifically, in the present embodiment, the insulating film 10 is formed in a square shape, and the first resin layer 20 covers all four sides of the insulating film 10. On the other hand, the first resin layer 20 does not cover the planned arrangement sites of the insulating film 10 where the first metal plate and the second metal plate 40 are to be arranged. For this reason, in the present embodiment, the first resin layer 20 is formed in a frame shape so as to cover the four sides of the insulating film 10 from both the front and back sides, and the metal plates 30, 40 are arranged in the frame. That is, the metal plates 30, 40 are always in direct contact with the insulating film 10 without interposing the first resin layer 20 between the insulating film 10 and the metal plates 30, 40. This is because the present invention employs a thin insulating film 10 for the purpose of making the gap between the metal plates 30. 40 as narrow as possible: however, in a case where the first resin layer 20 is interposed between the metal plates 30, 40 and the insulating film 10, the gap between the metal plates 30, 40 becomes large, and the above described object cannot be achieved. In other words, for this reason, the first resin layer 20 covers the surplus portion of the insulating film 10 that does not come into contact with any of the metal plates 30, 40 (the portion protruding from the metal plates 30, 40). The first resin layer 20 preferably covers a large portion of the surplus portion of the insulating film 10, specifically 80% or more, 90% or more, or 95% or more, from one surface side or both surface sides.

In the present embodiment, the first resin layer 20 is attached to the insulating film 10 by injection molding. Therefore, as the first resin layer 20, a resin material that undergoes a phase transition from liquid to solid is used. The first resin layer 20 may be made of, for example, a thermoplastic resin or a thermosetting resin: however, taking into consideration convenience during injection molding, using a thermoplastic resin is preferable. Examples of thermoplastic resin include: PBT (polybutylene terephthalate), PPS (polyphenylene sulfide), polyethylene terephthalate (PET), nylon, polypropylene, polyethylene, and ABS resin. In addition, examples of thermosetting resin include: phenolic resin, epoxy resin, melamine resin, polyester, and diallyl phthalate. However, thermoplastic resin and thermosetting resin are not limited to those listed here, and other known resins may be used.

As illustrated in FIG. 1, in the present embodiment, the insulating film 10 and the first resin layer 20 are each formed with a plurality of small holes 11, 21 and 22. These small holes 11, 21, and 22 are formed for fixing the surplus portion of the insulating film 10 in the mold when attaching the first resin layer 20 to the surplus portion of the insulating film 10 by injection molding. In the present embodiment, the small holes 11 are formed on all four sides of the insulating film 10; however, for example, it is also possible to form the small holes 11 in only a pair of long sides facing each other, or to form the small holes 11 in only a pair of short sides. In addition, in the first resin layer 20, first small holes 21 provided at positions overlapping with the small holes 11 of the insulating film 10 and second small holes 22 provided at positions not overlapping the small holes 11 of the insulating film 10 are formed. The first small holes 21 of the first resin layer 20 are formed by pins that are inserted into the small holes 11 of the insulating film 10 in the mold during the primary molding step. On the other hand, the second small holes 22 of the first resin layer 20 are formed by other pins that are not inserted into the small holes 11 of the insulating film 10 in the mold during the primary molding step, and hold the insulating film 10 by sandwiching the insulating film 10.

In the specification of the present application, the product obtained by attaching the first resin layer 20 to the insulating film 10 for reinforcing the same is referred to as an "intermediate product". The intermediate product 60 can be obtained by a primary molding step, which will be described later. The intermediate product 60 is integrated with the first metal plate 30 and the second metal plate 40 in a secondary molding step, which will be described later.

As illustrated in FIGS. 1 to 3, a conductive member 100 according to the present invention further includes a second resin layer 50 as an element for joining the first metal plate 30 and the second metal plate 40 to the intermediate product 60 composed of the insulating film 10 and the first resin layer 20. Note that, in the exploded view illustrated in FIG. 1, as in the case of the first resin layer 20, in order to show the arrangement of the second resin layer 50 in the present embodiment in an easy to understand manner, the second resin layer 50 is drawn as layers (50a, 50b) divided into the front side and the back side of the insulating film 10. However, in a case where the second resin layer 50 is formed by injection molding as described later, there is no substantial separation between the second resin layers 50 (50a and 50b) present on the front side and the back side of the insulating film 10, and both layers are integrally formed.

As illustrated in FIG. 2 and FIG. 3, the second resin layer 50 integrally joins the intermediate product 60 and the two metal plates 30, 40 together by covering the intermediate product 60 and the sandwiching parts 32, 42 of the two metal plates 30, 40 sandwiching the insulating film 10. However, the terminal portions 31 of the metal plates 30, 40 are not covered with the second resin layers 50 and protrude outside through first hole portions 51 formed in the second resin layers 50. Therefore, while the two metal plates 30, 40 are maintained in an insulated state, electricity can be supplied independently to each of the metal plates 30, 40. In addition, the second resin layers 50 are formed with second hole portions 52 penetrating to the sandwiching parts 32, 42 (horizontal portions) of the metal plates 30, 40. The second hole portions 52 are formed for the convenience of pushing the metal plates 30, 40 by the mold in the secondary molding step (injection molding step), which will be described later. Note that the second hole portions 52 also have the effect of dissipating heat generated when electricity is supplied to the metal plates 30, 40 to the outside.

In the present embodiment, the second resin layer 50 is formed by injection molding. Therefore, a thermoplastic resin or a thermosetting resin is used for the second resin layer 50 as in the case of the first resin layer 20. The second resin layer 50 may be made of the same kind of resin material as the first resin layer 20, or may be made of a different kind of resin material. In either case, an interface exists between the first resin layer 20 and the second resin layer 50, and thus both layers 20, 50 can be confirmed by analyzing the finally obtained conductive member 100.

Figure 4:
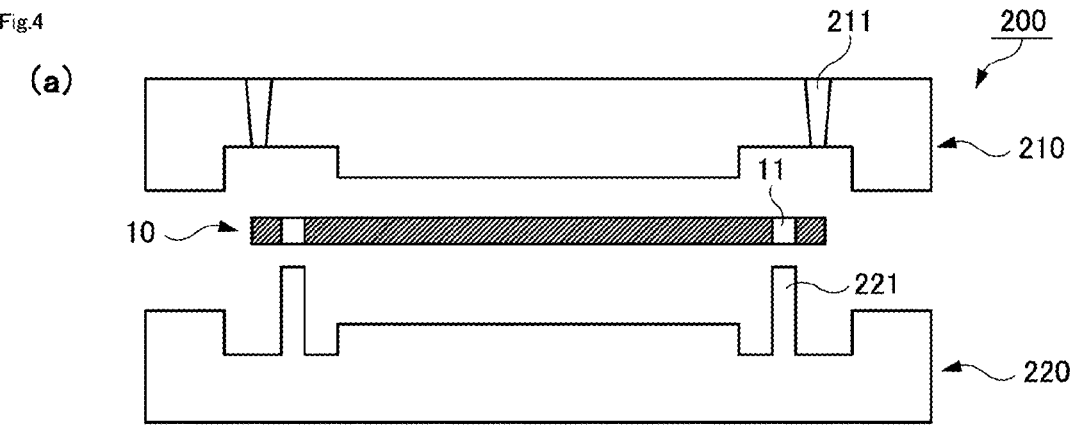
FIG. 4 schematically illustrates an example of a primary molding step by injection molding.
Figure 4:
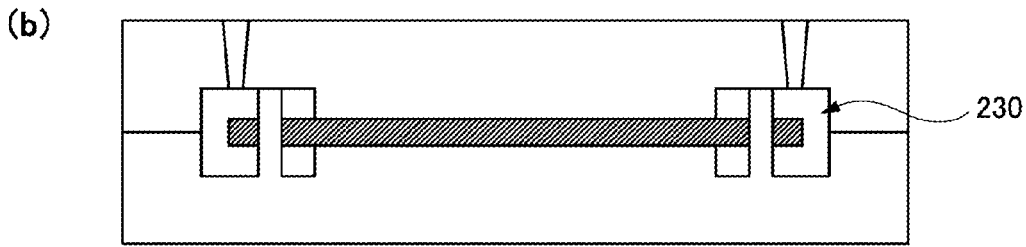
Figure 4:
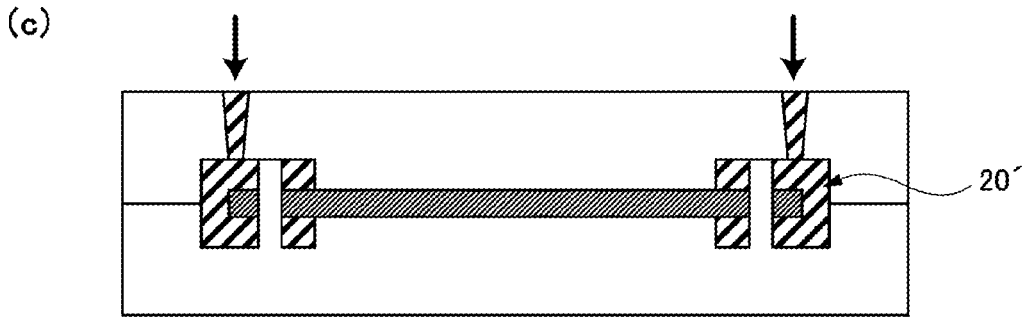
Figure 4:
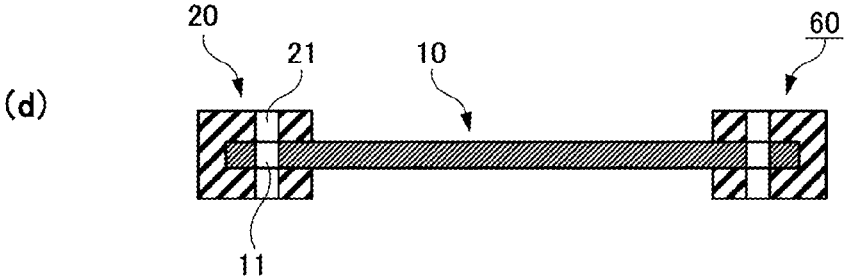
Figure 5:
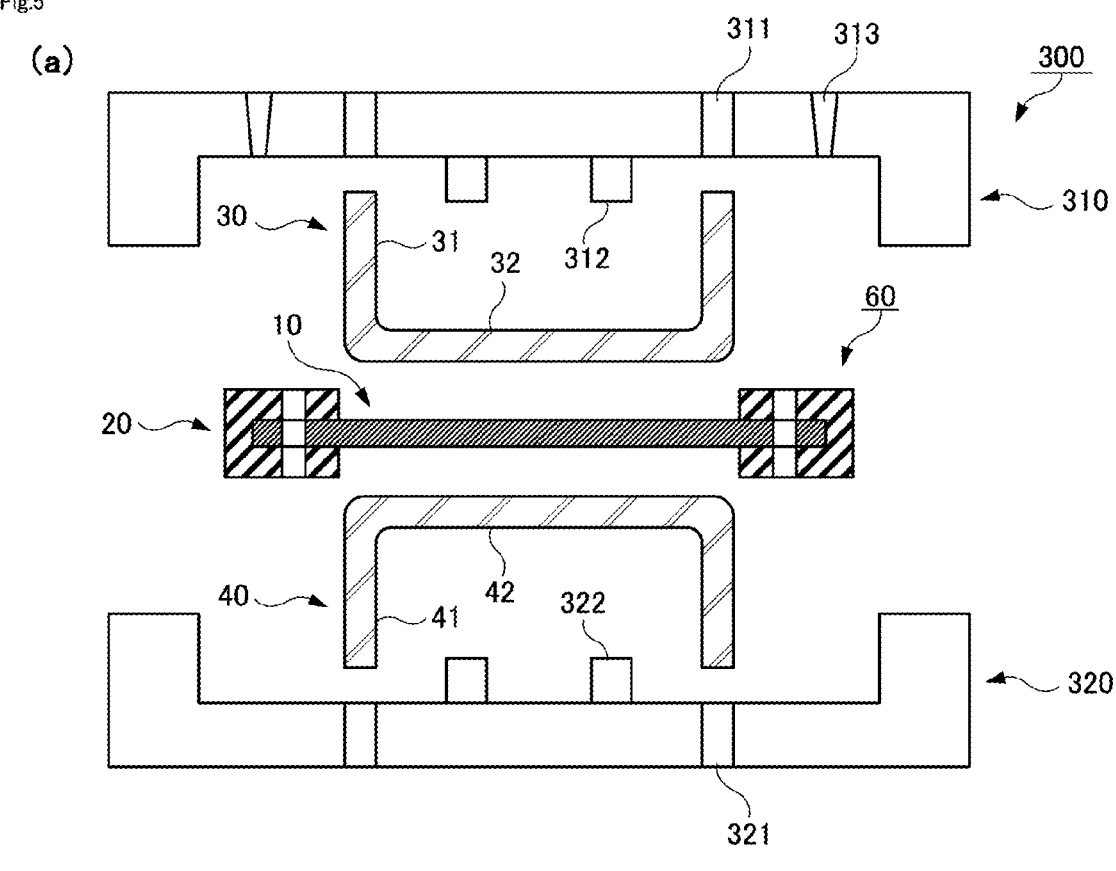
FIG. 5 schematically illustrates an example of a secondary molding step by injection molding.
Figure 5:
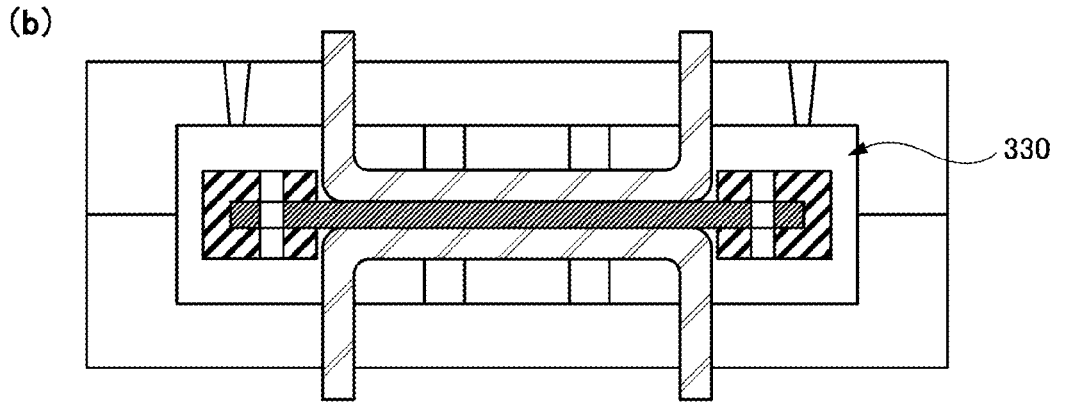
Figure 6:
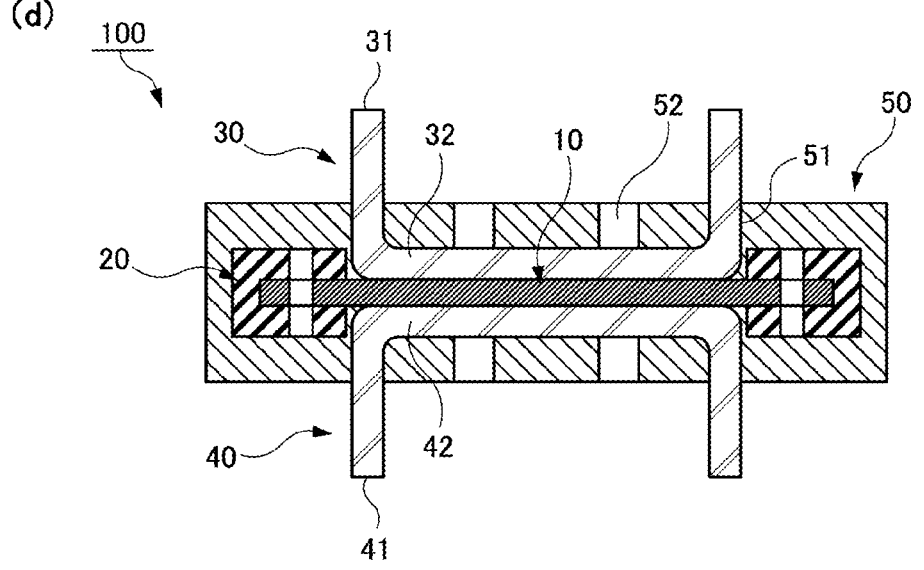
FIG. 6 schematically illustrates an example of a secondary molding step by injection molding.

Next, a method for producing the conductive member 100 according to the present embodiment will be described with reference to FIGS. 4 to 6. FIG. 4 illustrates a primary molding step for obtaining an intermediate product 60 in which the insulating film 10 is reinforced by the first resin layer 20, and FIG. 5 and FIG. 6 illustrate a secondary molding step for integrally joining the intermediate product 60 and the two metal plates 30, 40 by the second resin layer 50. Particularly, in the present embodiment, both the primary molding step and the secondary molding step are performed by injection molding.

As illustrated in (a) of FIG. 4, in the primary molding step, first, the insulating film 10 and a first mold 200 are prepared. The insulating film 10 is the insulating film described above, and small holes 11 are formed in the surplus portion. The first mold 200 includes an upper mold 210 and a lower mold 220. As illustrated in (b) of FIG. 4, the insulating film 10 is sandwiched between the upper mold 210 and the lower mold 220 of the first mold 200; however, recessed portions are formed inside the upper mold 210 and the lower mold 220 at positions corresponding to the surplus portion of the insulating film 10. The insulating film 10 is sandwiched by being in direct contact with the upper mold 210 and the lower mold 220 at the portions other than the recessed portions. When the upper mold 210 and the lower mold 220 are fitted together, a cavity 230 is defined by these recessed portions. The shape of the cavity 230 corresponds to the shape of the first resin layer 20 described above. In addition, the upper mold 210 is provided with a gate 211 connected to the cavity 230. One gate 211 may be provided for one cavity 230; however, a plurality of gates 211 may be provided for one cavity 230.

Note that, as illustrated in (a) and (b) of FIG. 4, small holes 11 are formed in the surplus portion of the insulating film 10. Pins 221 to be inserted into the small holes 11 of the insulating film 10 are provided in the cavity 230 of the first mold 200. In the example illustrated in FIG. 4, the pins 221 are provided on the lower mold 220, but it is also possible to provide pins on the upper mold 210 instead. The surplus portion of the insulating film 10 in the cavity 230 of the first mold 200 becomes a free end that is not fixed anywhere: however, by providing the pins 221 to be inserted into the small holes 11 of the surplus portion in this way, the movement of the surplus portion of the insulating film 10 can be restricted. In addition, by inserting the pins 221 into the small holes 11 of the insulation film 10, a state in which tension is applied to the insulation film 10 can be maintained, and thus the accuracy of the primary molding step may be improved.

Next, as illustrated in (c) of FIG. 4, a molten resin 20' for forming the first resin layer 20 is injected into the cavity 230 through the gates 211 of the first mold 200. Note that a thermoplastic resin is generally used as the molten resin 20'. In this case, the molten resin 20' injected into the cavity 230 is in a high temperature state. After that, the molten resin 20' is solidified within the cavity 230. In a case where a thermoplastic resin is used as the molten resin 20', the resin may be cooled within the cavity 230. Note that in a case where a thermosetting resin is used as the molten resin 20', the resin may be heated in the mold. By solidifying the molten resin 20', the first resin layer 20 covering the surplus portion of the insulating film 10 is formed. In this way, as illustrated in (d) of FIG. 4, an intermediate product 60 is obtained in which the peripheral edge of the insulating film 10 is reinforced by the first resin layer 20. Note that small holes 21 corresponding to the shape of the pins 221 of the first mold 200 are formed in the first resin layer 20. The small holes 21 of the first resin layer 20 communicate with the small holes 11 of the insulating film 10, and these small holes 11, 21 pass through the intermediate product in the thickness direction.

Next, in the secondary molding step, as illustrated in (a) of FIG. 5, first, the intermediate product 60 obtained in the primary molding step, the first metal plate 30, the second metal plate 40, and a second mold 300 are prepared. The two metal plates 30, 40 are as described above, and have sandwiching parts 32, 42 that are directly in contact with the insulating film 10, and terminal portions 31 provided at both ends thereof. The second mold 300 includes an upper mold 310 and a lower mold 320. As illustrated in (b) of FIG. 5, the intermediate product 60 and the sandwiching parts 32, 42 of the two metal plates 30, 40 are accommodated between the upper mold 310 and the lower mold 320 of the second mold 300; however, inside the upper mold 310 and the lower mold 320, recessed portions are formed to form a cavity 330 for accommodating these components. That is, when the upper mold 310 and the lower mold 320 are fitted together, a cavity 330 (empty space) is defined by these recessed portions. The shape of the cavity 330 of the second mold 300 corresponds to the shape of the third resin layer 50 described above. In addition, hole portions 311 into which the terminal portions 31 of the first metal plate 30 are inserted are formed in the upper mold 310, and similarly, hole portions 321 into which the terminal portions 41 of the second metal plate 40 are inserted are formed in the lower mold 320. Moreover, the upper mold 310 is provided with a gate 313 connected to the cavity 330. One gate 313 may be provided for one cavity 330; however, a plurality of gates 313 may also be provided for one cavity 330.

Further, as illustrated in (b) of FIG. 5, in the second mold 300, an exposed portion of the insulating film 10 that is not covered with the first resin layer 20 is sandwiched between the sandwiching parts 32, 42 of the metal plates 30, 40. On the other hand, a large portion of the surplus portion of the insulating film 10 that is not fixed between the metal plates 30, 40 is covered with the first resin layer 20. Therefore, by attaching the first resin layer 20 to the insulating film 10 in advance, the metal plates 30, 40 need only be arranged in alignment with the exposed portion of the insulating film 10 before the secondary molding step, and thus alignment between the insulating film 10 and the metal plates 30 40 is facilitated, which leads to an improvement in accuracy.

In addition, as illustrated in FIG. 5, the second mold 300 has a plurality of protrusions 312, 322 formed on inner surface sides of the upper mold 310 and the lower mold 320 (surfaces on the cavity 320 side). The protrusions 312, 322 are provided at positions where they come in contact with the sandwiching parts 32, 42 of the two metal plates 30, 40 sandwiching the insulating film 10 when the upper mold 310 and the lower mold 320 are fitted together. Therefore, when the second mold 300 is closed, the sandwiching parts 32, 42 of the two metal plates 30, 40 are pressed toward the insulating film 10 by these protrusions 312, 322. By performing injection molding while biasing the sandwiching parts 32, 42 of the two metal plates 30, 40 toward the insulating film 10 in this manner, it is possible to suppress the occurrence of wrinkles and twists in the insulating film 10 during the injection molding step. Moreover, in the completed conductive member 100, hole portions corresponding to the protrusions 312, 322 of the second mold 300 are formed in the second resin layer 50, and heat generated in the two metal plates 30, 40 can be dissipated to the outside through the hole portions.

Next, as illustrated in (c) of FIG. 6, molten resin 50' for forming the second resin layer 50 is injected into the cavity 330 through the gates 313 of the second mold 300. Note that as the molten resin 50' for the second resin 50, a thermoplastic resin or a thermosetting resin is used similar to the molten resin 20' for the first resin layer 20 described above. The molten resin 50' is then solidified in the cavity 330 of the second mold 300. As a result, as illustrated in (d) of FIG. 6, a conductive member 100 in which the entire insulating film 10, the entire first resin layer 20, and the sandwiching parts 32, 42 of the two metal plates 30, 40 are enclosed in the second resin layer 50 is obtained. Note that in this conductive member 100, the terminal portions 31 of the two metal plates 30, 40 are exposed to the outside through the hole portions 51 of the second resin layer 50. The structure of the conductive member 100 illustrated in (d) of FIG. 6 is basically the same as that illustrated in FIG. 3.

Next, various patterns of the intermediate product 60 obtained by the primary molding step will be described with reference to FIG. 7 and FIG. 8. First, in the pattern illustrated in (a) of FIG. 7, all four sides of the rectangular insulating film 10 are reinforced by the first resin layer 20, as in the above-described embodiment. Note that in this pattern, the small holes 11, 21 for pinning are provided only in the pair of long sides of the insulating film 10 and the first resin layer 20. In addition, in the pattern illustrated in (b) of FIG. 7, three sides of the rectangular insulating film 10 are reinforced with the first resin layer 20. In this way, it is not necessary to cover the entire periphery of the insulating film 10 with the first resin layer 20, and it is possible to leave an edge portion partially uncovered.

Figure 7:
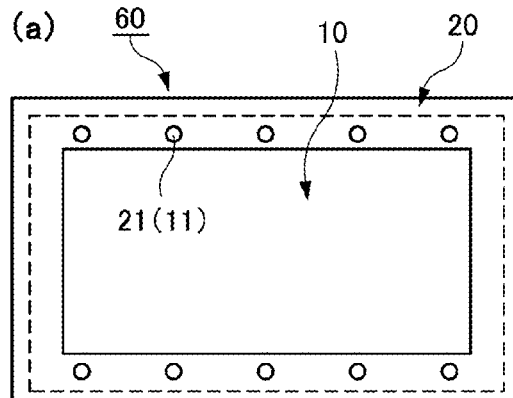
FIG. 7 is plan views illustrating pattern examples of an intermediate product obtained by the primary molding step.
Figure 7:
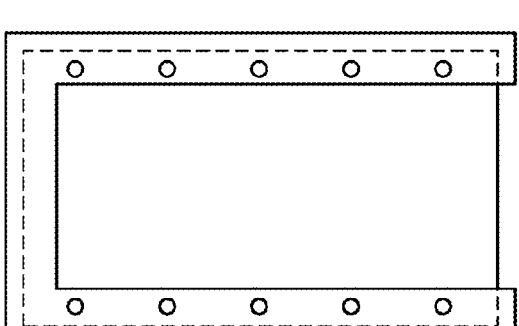
Figure 7:
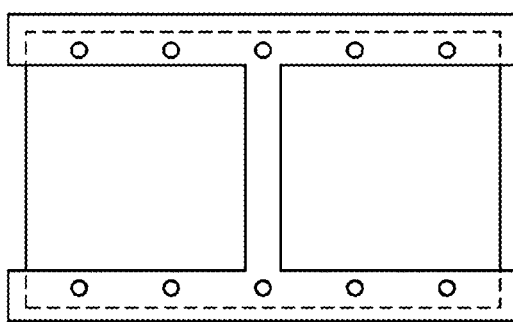
Figure 7:
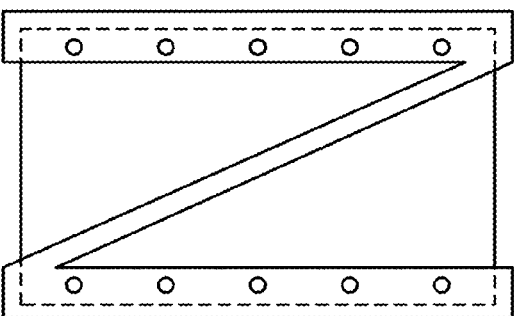
Figure 7:
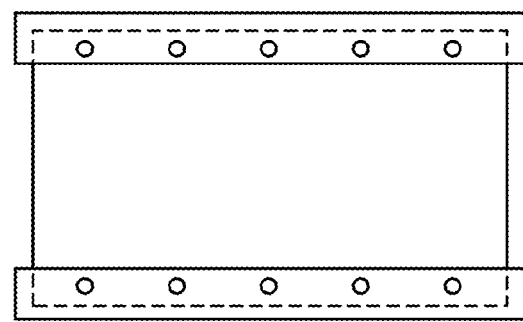
Figure 7:
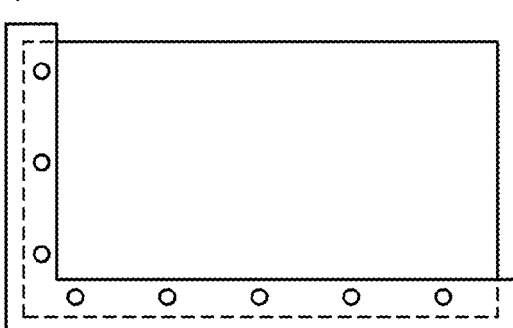

In the patterns illustrated in (c) and (d) of FIG. 7, only two opposing sides (a pair of long sides) of the insulating film 10 are reinforced with the first resin layer 20, and a covered portion of the first resin layer 20 that crosses the surface of the insulating film 10 is further provided so as to connect the first resin layer 20 on the two sides. In (c) of FIG. 7, the first resin layer 20 is H-shaped in plan view, and in (d) of FIG. 7, the first resin layer 20 is Z-shaped in plan view. In addition, in such a pattern, the metal plates 30, 40 are arranged so as not to overlap the covered portion of the first resin layer 20 crossing the surface of the insulating film 10.

In the pattern illustrated in (e) of FIG. 7, only two opposing sides (a pair of long sides) of the insulating film 10 are reinforced by the first resin layer 20, and the other two sides (a pair of short sides) are exposed as is. Even with this kind of pattern, by forming the small holes 11, 21 for pinning in the insulating film 10 and the first resin layer 20, it is possible to prevent the occurrence of wrinkling and twisting of the insulating film 10 inside the mold during the primary molding step.

In the pattern illustrated in (f) of FIG. 7, only two adjacent sides (long side and short side) of the insulating film 10 are reinforced by the first resin layer 20, and the other two sides (long side and short side) are exposed as is. In this pattern, the first resin layer 20 is L-shaped in plan view. In this pattern, the corner portion of the insulating film 10 not covered with the first resin layer 20 (upper right corner in the figure) becomes unstable, and thus although this cannot be said to be a preferred form, such a pattern may also be adopted by devising the arrangement of the metal plates 30, 40 on the insulating film 10.

Note that in the patterns illustrated in FIG. 7, it is assumed that the insulating film 10 is rectangular, but the shape of the insulating film 10 is not limited to being rectangular, and it may have various shapes depending on the application and may be triangular, pentagonal, polygonal, circular, elliptical, or the like.

Figure 8:
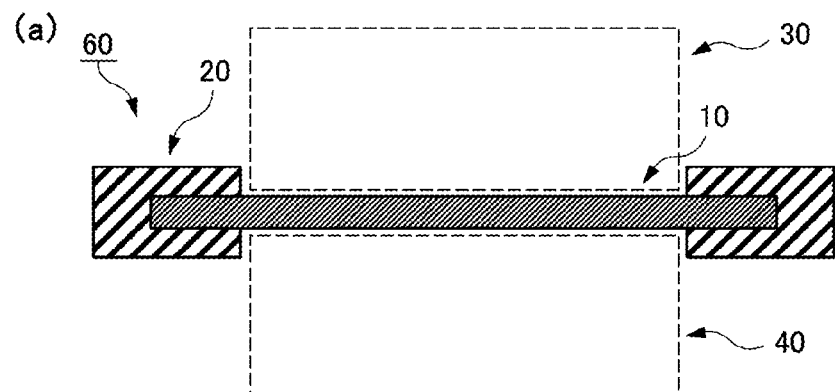
FIG. 8 is cross-sectional views illustrating pattern examples of an intermediate product obtained by the primary molding step.
Figure 8:
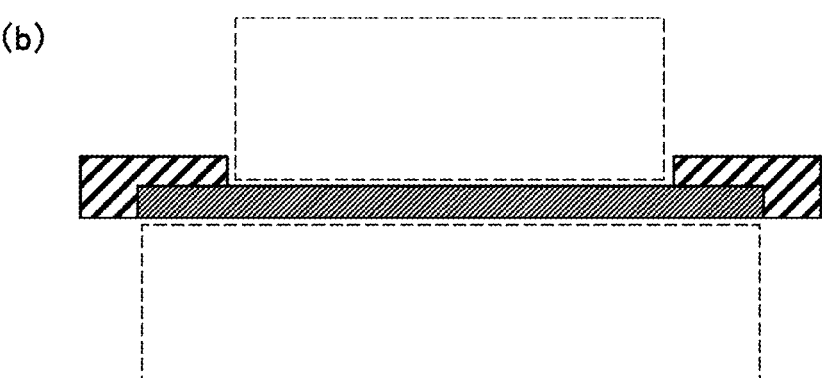
Figure 8:
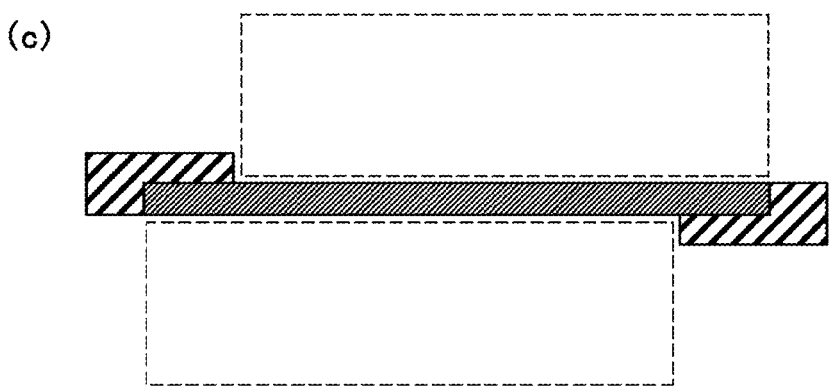

FIG. 8 illustrates a cross section of the intermediate product 60. In addition, in FIG. 8, the planned arrangement sites of the first metal plate 30 and the second metal plate 40 are each indicated by a broken line. In the pattern illustrated in (a) of FIG. 8, the edge portions (surplus portion) of the insulating film 10 are covered with the first resin layer 20 from both the front and back sides, as in the embodiment described above. Such a pattern is suitable, for example, when the first metal plate 30 placed on the front side of the insulating film 10 and the second metal plate 40 placed on the back side are the same size.

In the pattern illustrated in (b) of FIG. 8, the surplus portion of the insulating film 10 is covered with the first resin layer 20 only from the front surface (one surface) side, and the entire back surface is exposed without providing a covering portion of the first resin layer 20 on the back surface (the other surface) side. Such a pattern is suitable, for example, in a case where the size of the second metal plate 40 placed on the back side of the insulating film 10 is larger than the size of the first metal plate 30 placed on the front side of the insulating film 10.

In the pattern illustrated in (c) of FIG. 8, one side of the surplus portion of the insulating film 10 is covered with the first resin layer 20 only from the front surface (one surface) side, and a covering portion of the first resin layer 20 is not provided on the back surface (the other surface) side and the back surface side is exposed. On the other hand, another side of the surplus portion of the insulating film 10 is covered with the first resin layer 20 only from the back surface (the other surface) side, and a covering portion of the first resin layer 20 is not provided on the front surface (one surface) side and the front surface side is exposed. In this way, the surfaces covered with the first resin layer 20 can be made different for each side of the insulating film 10. Such a pattern, for example, is suitable for cases such as where the first metal plate 30 arranged on the front side of the insulating film 10 and the second metal plate 40 arranged on the back side do not completely overlap but are partially shifted.

Next, with reference to FIG. 9 and FIG. 10, a modification of the conductive member 100 different from the embodiment illustrated in FIGS. 1 to 6 will be described. First, in the example illustrated in FIG. 9, the first resin layer 20 is formed on the surplus portion of a pair of long sides of the rectangular insulating film 10 so as to cover both the front and back surfaces. The cross-sectional shape of the first resin layer 20 provided on the pair of long sides is similar to the cross-section illustrated in (a) of FIG. 8. On the other hand, of the surplus portion of the pair of short sides of the insulating film 10, a first resin layer 20 is formed so as to cover only the front surface of one of the short sides, and as for the other short side, a first resin layer 20 (not illustrated in the figure) is formed so as to cover only the back surface. The cross-sectional shape of the first resin layer 20 provided on the pair of short sides is similar to the cross-section illustrated in (c) of FIG. 8.

Figure 9:
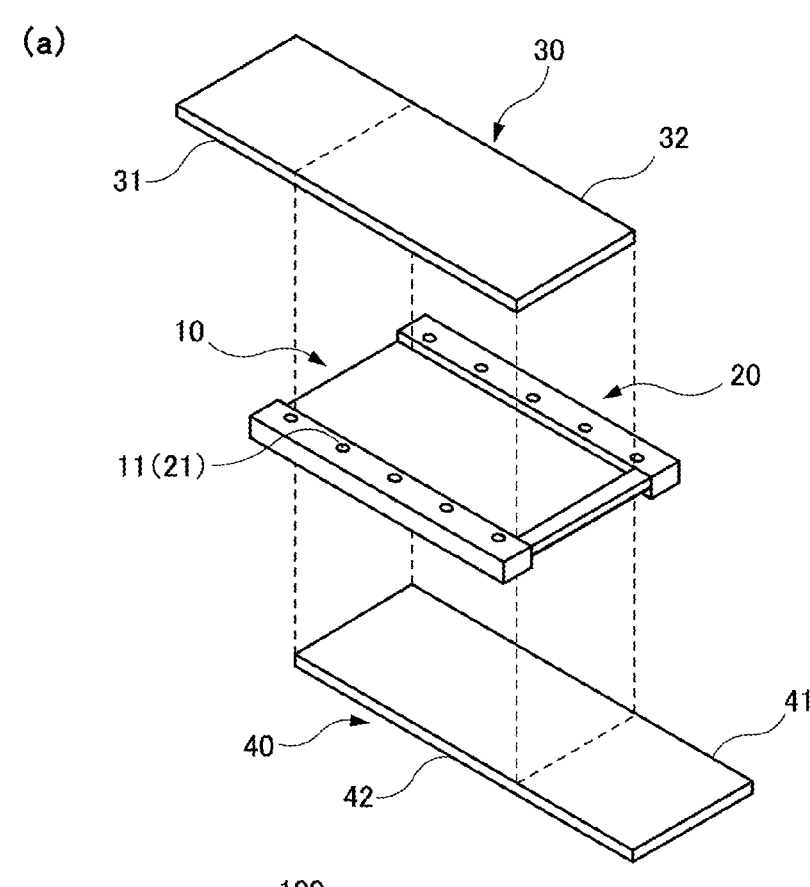
FIG. 9 schematically illustrates another example of how to combine the intermediate product obtained by the primary molding step and two busbars.

In addition, in the example illustrated in FIG. 9, rectangular plates are used as the two metal plates 30, 40, and no bending step has been performed. The first metal plate 30 is arranged on the front surface side of the insulating film 10 so as not to overlap with the first resin layer 20. The first metal plate 30 extends from the short side of the front surface side of the insulating film 10 where the first resin layer 20 is not provided and the extended portion becomes the terminal portion 31, and a portion overlapping with the insulating film 10 becomes the sandwiching part 32. Similarly, the second metal plate 40 is arranged on the back surface side of the insulating film 10 so as not to overlap with the first resin layer 20. The second metal plate 40 extends from the short side of the back surface side of the insulating film 10 where the first resin layer 20 is not provided and the extended portion becomes the terminal portion 41, and a portion overlapping with the insulating film 10 becomes the sandwiching part 42. Therefore, the first metal plate 30 and the second metal plate 40 are arranged on the front surface side and the back surface side of the insulating film 10, respectively, in a partially shifted state.

In (b) of FIG. 9, a state is illustrated in which the insulating film 10 reinforced by the first resin layer 20 and the two metal plates 30, 40 are integrally bonded by the second resin layer 50. Note that in (b) of FIG. 9, the second resin layer 50 is illustrated as being transparent. In this way, it is also possible to obtain a relatively flat conductive member 100.

Figure 10:
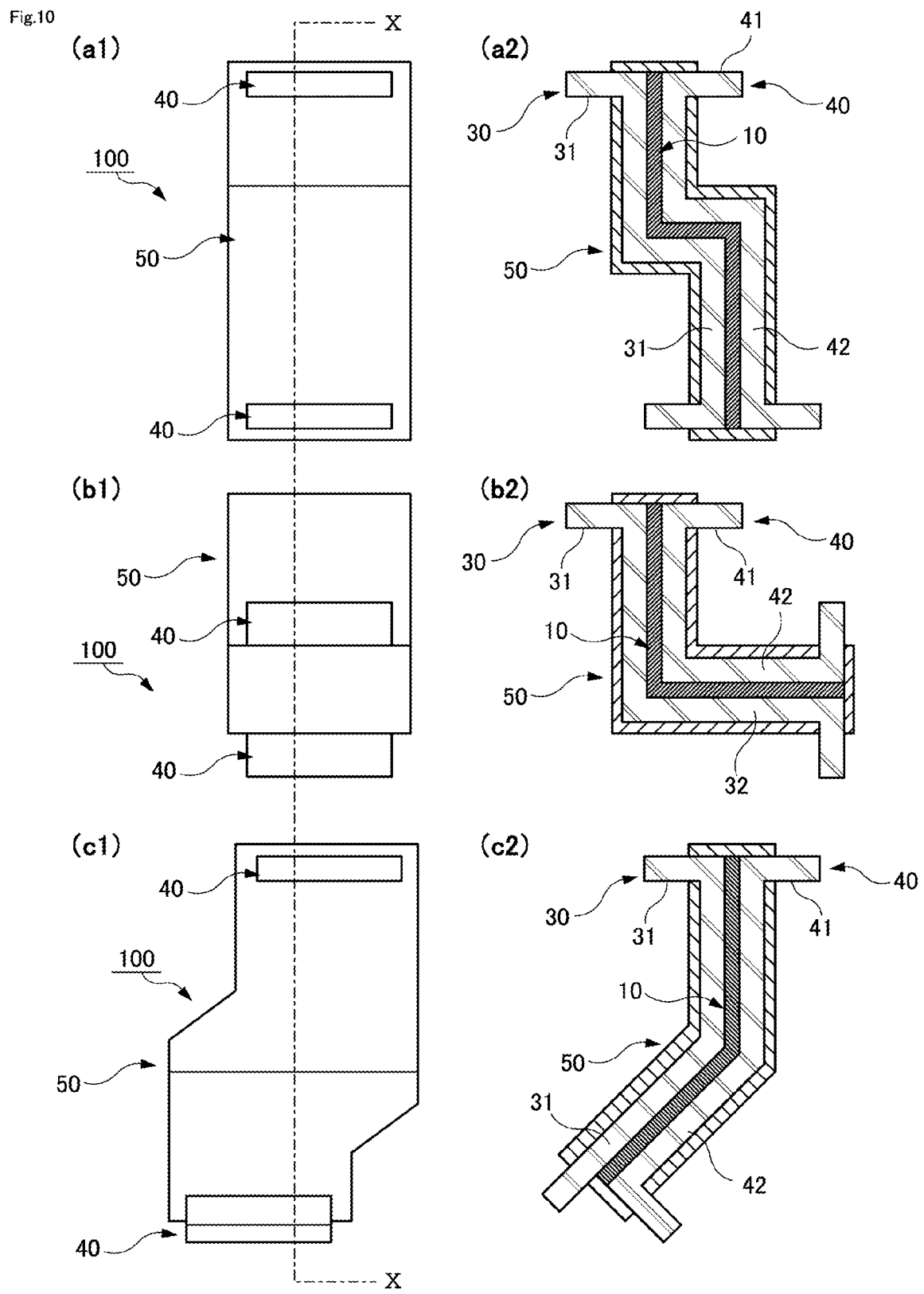
FIG. 10 schematically illustrates mainly examples of the shape of the busbar.

FIG. 10 illustrates various variations of the conductive member 100, in particular variations of the two metal plates 30, 40. The shape of the conductive member 100 (metal plates 30, 40) is not limited to that illustrated in FIG. 10; however, FIG. 10 illustrates three variations that can be used relatively commonly. Note that (a2), (b2) and (c2) of FIG. 10 illustrate cross-sectional shapes taken along line X-X of the conductive member 100 illustrated in (a1), (b1), and (c1) of FIG. 10, respectively.

In the conductive member 100 illustrated in (a1) and (a2) of FIG. 10, the two metal plates 30, 40 are rectangular in plan view. In addition, the sandwiching parts 32, 42 of the two metal plates 30, 40 sandwiching the insulating film 10 are bent at right angles at two points, and processed into a crank shape when viewed in cross section. Furthermore, two terminal portions 31, 41 are formed on the metal plates 30, 40 by bending the end portions of the two metal plates 30, 40.

Moreover, in the conductive member 100 illustrated in (b1) and (b2) of FIG. 10, two metal plates 30, 40 that are rectangular in plan view are used. In addition, the sandwiching parts 32, 42 of the two metal plates 30, 40 sandwiching the insulating film 10 are bent at a right angle at one point, and are processed into an L-shape in cross-section. Furthermore, two terminal portions 31, 41 are formed on the metal plates 30, 40 by bending the end portions of the two metal plates 30, 40.

Moreover, in the conductive member 100 illustrated in (c1) and (c2) of FIG. 10, the two metal plates 30, 40 are each cut or punched to have an octagonal shape with a bent portion in plan view. In addition, in this conductive member 100, the sandwiching parts 32, 42 of the two metal plates 30, 40 sandwiching the insulating film 10 are bent obtusely at an obtuse angle also in cross-sectional view. Furthermore, two terminal portions 31, 41 are formed on the metal plates 30, 40 by bending the end portions of the two metal plates 30, 40.

In this way, the shape of the conductive member 100, particularly the shape of the metal plates 30, 40, can be appropriately processed into an optimal shape according to the application of the conductive member 100.

Figure 11:
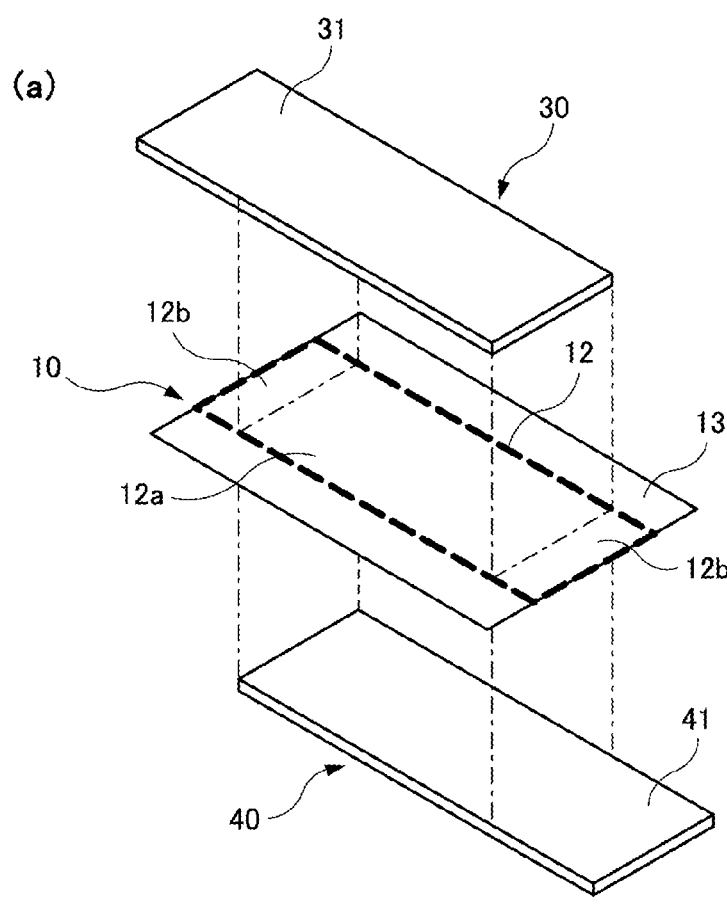
FIG. 11 is a diagram for describing the concept of the portions of the insulating film where the metal plate is to be arranged and other surplus portion.
Figure 11:
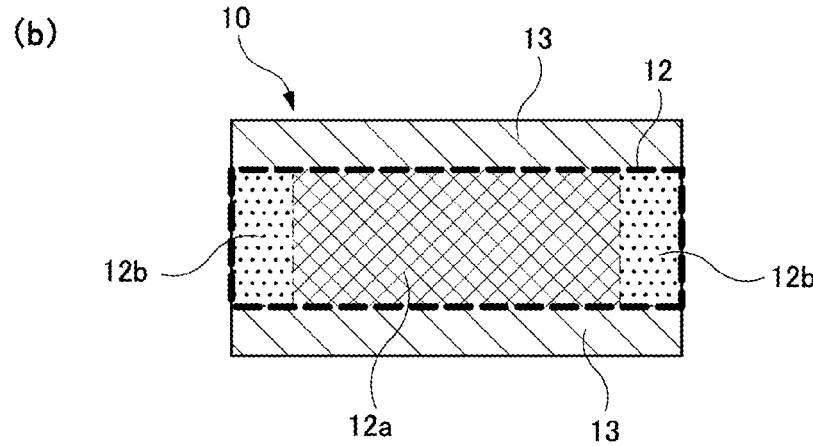

Next, referring to FIG. 11, the meanings of the terms "planned arrangement site" and other "surplus portion" of the two metal plates 30, 40 in regard to the insulating film 10 will be summarized. In a case where the arrangement relationship between the insulating film 10 and the two metal plates 30, 40 as illustrated in (a) of FIG. 11 is presumed, of the insulating film 10, the area indicated by the bold dashed line is the planned arrangement site 12, and the remaining portion is the surplus portion 13. That is, the planned arrangement site 12 is a site of the insulating film 10 that comes into contact with both or one of the two metal plates 30, 40. The planned arrangement site 12 includes a double-sided contact portion 12a that comes in contact with both of the two metal plates 30, 40, and a single-sided contact portion 12b that comes in contact with only one of the two metal plates 30, 40. As illustrated in (a) of FIG. 11, in a case where the positions of the two metal plates 30, 40 are shifted, a single-sided contact portion 12b is formed within the planned arrangement site 12. Note that, although not illustrated, in a case where the positions of the two metal plates 30, 40 are not shifted, the planned arrangement site 12 is only the double-sided contact portion 12a. On the other hand, the surplus portion 13 is a portion of the insulating film 10 other than the planned arrangement site 12. That is, the surplus portion 13 is a portion that does not come into contact with either of the two metal plates 30, 40. Such a surplus portion 13 is likely to be formed mainly at the peripheral edge of the insulating film 10.

In a case where the insulating film 10 is viewed from above as illustrated in (b) of FIG. 11, a large part of the surplus portion 13 of the insulating film 10 can preferably be covered with the first resin layer 20 from both sides or one side. More specifically, 80% or more, and particularly 90% or more of the surplus portion 13 may preferably be covered with the first resin layer 20 from both sides or one side. On the other hand, it is impossible to form the first resin layer 20 on the double-sided contact portion 12a of the planned arrangement site 12 of the insulating film 10. However, regarding the single-sided contact portion 12b of the planned arrangement site 12 of the insulating film 10, it is possible to cover the surface opposite to the surface where the metal plates 30, 40 are in contact with the first resin layer 20 (see (a) of FIG. 8). In the present invention, preferably a large part (80% or 90% or more) of the single-sided contact portion 12b is covered with the first resin layer 20 from the surface on the opposite side to the surface in contact with the metal plates 30, 40.

The preferred embodiments of the present invention have been described above, mainly taking as an example a case where the first resin layer 20 and the second resin layer 50 are each formed by injection molding. However, for the first resin layer 20 and the second resin layer 50, it is also possible to create a part made of solidified resin in advance, and finally combine that part with the insulating film 10 and the two metal plates 30, 40. In that case, for example, as illustrated in FIG. 1, the first resin layer 20 and the second resin layer 50 are each created as separate components from the insulating film 10 and the two metal plates 30, 40. It is also possible to produce the conductive member 100 by finally assembling (combining) all these components.

As mentioned above, in this specification, in order to express the content of the present invention, embodiments of the present invention have been described with reference to the drawings. However, the present invention is not limited to the above-described embodiments, and includes modifications and improvements that are obvious to a person skilled in the art based on the matters described in this specification.

REFERENCE SIGNS LIST

10 Insulating film
11 Small hole
12 Planned arrangement site
12a Double-sided contact portion
12b Single-sided contact portion
13 Surplus portion
20 First resin layer
21 First small hole
22 Second small hole
30 First metal plate
31 Terminal portion
32 Sandwiching part
40 Second metal plate
41 Terminal portion
42 Sandwiching part
50 Second resin layer
51 First hole portion
52 Second hole portion
60 Intermediate product
100 Conductive member
200 First mold
210 Upper mold
211 Gate
220 Lower mold
221 Pin
230 Cavity
300 Second mold
310 Upper mold
311 Hole portion 312 Protrusion
313 Gate
320 Lower mold
321 Hole portion
322 Protrusion
330 Cavity

The invention claimed is:

1. A production method of a conductive member in which an insulating film having a front side and a back side and a peripheral edge is interposed between two metal plates, the production method of a conductive member comprising:

primary molding of producing an intermediate product in which the insulating film is covered with a solidified insulating first resin such that the front side and the back side of the insulating film is at least partially exposed; and secondary molding of covering sandwiching parts of the two metal plates sandwiching the insulating film with an insulating second resin that covers the solidified insulating first resin in a state where at least a portion of the exposed part of the insulating film in the intermediate product is sandwiched between the two metal plates and in direct contact with the two metal plates.

2. The production method according to claim 1, wherein the primary molding includes covering all or part of the peripheral edge of the insulating film with the first resin.

3. The production method according to claim 1, wherein the primary molding includes arranging the insulating film in a first mold having a cavity corresponding to the portion covered with the first resin, injecting molten first resin into the cavity, and then solidifying the first resin.

4. The production method according to claim 3, wherein in the primary molding, the molten first resin is injected into the cavity in a state where a part of the insulating film inserted into the cavity of the first mold is fixed by the first mold.

5. The production method according to claim 1, wherein the secondary molding includes arranging the sandwiching parts of the two metal plates in a second mold having a cavity corresponding to a portion to be covered with the second resin, injecting molten the second resin into the cavity, and then solidifying the second resin.

6. The production method according to claim 5, wherein in the secondary molding, the second resin which is molten is injected into the cavity of the second mold while the second mold presses the sandwiching parts of the two metal plates toward the insulating film from one side or both sides.

* * * * *